UNITED STATES PATENT OFFICE.

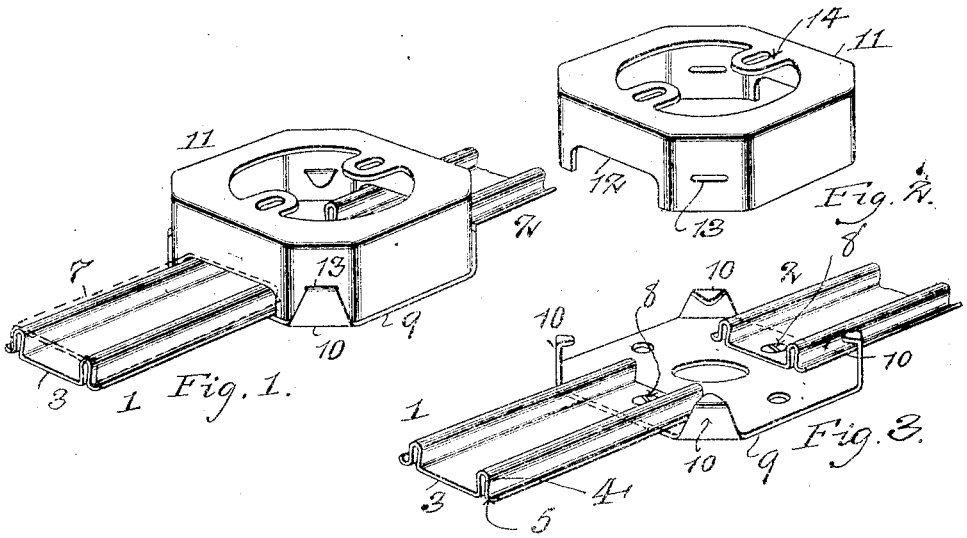

THOMAS E. MURRAY, OF NEW YORK, N. Y.

OUTLET-BOX FOR PROTECTIVE CASINGS FOR LINE CONDUCTORS.

1,142,835.　　　　Specification of Letters Patent.　　Patented June 15, 1915.

Application filed March 10, 1913.　Serial No. 753,359.

*To all whom it may concern:*

Be it known that I, THOMAS E. MURRAY, a citizen of the United States, residing at New York, in the county of New York and State of New York, have invented a certain new and useful Improvement in Outlet-Boxes for Protective Casings for Line Conductors, of which the following is a specification.

The invention is an outlet box for protective casings for line conductors, and consists in the construction more particularly hereinafter set forth.

In the accompanying drawings—Figure 1 is a perspective view of my device. Fig. 2 is a similar view of the cover of the outlet-box separately. Fig. 3 is a similar view of the base portion of said outlet-box, with the trough-shaped lower portions of the casing secured thereto.

In Fig. 1, a cover section of the casing is indicated by dotted lines.

Similar numbers of reference indicate like parts.

1, 2 are adjacent base sections of the protective casing. Each section has a flat bottom 3, and longitudinal side flanges which are bent over outwardly to form double walls 4 and then outwardly again, as shown at 5, to form gutters. The said base sections are to be secured to the wall or other support by any suitable means, and form a receiving trough for the line conductors. They are provided with covers, as indicated by dotted lines Fig. 1.

In order to make an outlet at any desired point on the casing, the cover being removed, the adjacent base sections may be separated, and connected, as shown in Fig. 3, by screws 8 to the sheet metal base plate 9 of an outlet-box. Said base plate is polygonal in form and has at its corners upwardly turned inwardly hooked flanges 10. The cover plate 11 of the outlet box is of the same polygonal shape as the base portion 9, and is provided with recesses 12 in opposite side flanges to fit upon said base sections, and with slits 13 in its corner flanges to receive the hooked over upper ends of flanges 10. In the upper side of the cover 11 is an opening provided with slotted lugs 14 for the attachment of any device to be connected in circuit to the line conductors.

When the casing covers are in place, the ends thereof abut against the outlet box, as indicated by dotted lines in Fig. 1.

I claim:

1. An outlet box for protective casings for line conductors, comprising a bottom plate interposed between and connected to said casings, an inverted box-shaped cover receiving the ends of said casings in recesses in its side walls, and means for connecting said cover to said bottom plate: the said cover having an outlet opening for said line conductors in its top wall.

2. An outlet box for protective casings for line conductors, comprising a bottom plate interposed between and connected to said casings, an inverted box-shaped cover receiving the ends of said casings in recesses in its side walls, and an outlet duct for said line conductors on the top wall of said cover.

3. An outlet box for protective casings for line conductors, comprising a bottom plate interposed between and connected to said casings, an inverted box-shaped cover receiving the ends of said casings in recesses in its side walls, and tongues on said bottom plate engaging openings in said cover: the said cover having an outlet opening for said line conductors in its top wall.

In testimony whereof I have affixed my signature in presence of two witnesses.

THOMAS E. MURRAY.

Witnesses:
　GERTRUDE T. PORTER,
　MAY T. McGARRY.